US012160723B2

(12) United States Patent
Shao

(10) Patent No.: US 12,160,723 B2
(45) Date of Patent: Dec. 3, 2024

(54) COAXIAL SPEAKER

(71) Applicant: AAC Microtech (Changzhou) Co., Ltd., Changzhou (CN)

(72) Inventor: Tao Shao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 298 days.

(21) Appl. No.: 17/840,584

(22) Filed: Jun. 14, 2022

(65) Prior Publication Data

US 2023/0239630 A1 Jul. 27, 2023

(30) Foreign Application Priority Data

Jan. 25, 2022 (CN) ......................... 202220212349.1

(51) Int. Cl.
*H04R 9/06* (2006.01)
*H04R 7/04* (2006.01)

(52) U.S. Cl.
CPC ................. *H04R 9/06* (2013.01); *H04R 7/04* (2013.01)

(58) Field of Classification Search
CPC ........ H04R 9/06; H04R 7/04; H04R 2499/13; H04R 9/063; H04R 1/24; H04R 9/025; H04R 1/02; H04R 1/1058; H04R 1/1075; H04R 9/02; H04R 9/045; H04R 7/12; H04R 7/16; H04R 11/02; H04R 19/02; H04R 2201/02; H04R 2400/02
See application file for complete search history.

(56) References Cited

U.S. PATENT DOCUMENTS

| | | | | |
|---|---|---|---|---|
| 11,930,341 B2 * | 3/2024 | Shao | H04R 1/02 | |
| 2011/0044491 A1 * | 2/2011 | Ku | H04R 9/06 | 381/433 |
| 2012/0051581 A1 * | 3/2012 | Danovi | H04R 9/025 | 381/412 |

FOREIGN PATENT DOCUMENTS

| | | | |
|---|---|---|---|
| CN | 108737937 A * | 11/2018 | H04R 9/02 |

* cited by examiner

*Primary Examiner* — Angelica M McKinney
(74) *Attorney, Agent, or Firm* — W&G Law Group

(57) ABSTRACT

The present invention provides a coaxial speaker including a frame, a magnetic circuit system, a first vibration system and a second vibration system. The magnetic circuit system includes a magnetic bowl having a side wall, a top wall, a first magnet assembly and a second magnet assembly. The first vibration system includes a first diaphragm and a first voice coil assembly. The second vibration system includes a second diaphragm and a second voice coil assembly, and the second voice coil assembly is at least partially inserted into the second magnetic gap. The coaxial speaker is arranged with strong performance, simple structure and low cost.

9 Claims, 4 Drawing Sheets

COAXIAL SPEAKER

FIELD OF THE PRESENT DISCLOSURE

The invention relates to the technical field of electro-acoustic transducers, in particular to coaxial speaker.

DESCRIPTION OF RELATED ART

The car speaker is an important part of the car entertainment system, providing functions such as music playback and voice interaction. The vehicle-mounted speaker is usually installed in the car door, and the installation space in the car door is limited, which greatly limits the size of the vehicle-mounted speaker. the vehicle-mounted speaker in the prior art is generally large in size, which does not conform to the trend of device miniaturization.

Therefore, it is necessary to provide a new coaxial speaker to solve the above technical problems.

SUMMARY OF THE PRESENT INVENTION

The purpose of the present invention is to provide a coaxial speaker with good acoustic performance, simple structure and low cost.

Accordingly, the present invention provides a coaxial speaker, including: a frame; a magnetic circuit system fixed on the frame, including a magnetic bowl having a side wall forming a containment space and a top wall formed by bending and extending from one end of the side wall; a first vibration system; a second vibration system coaxially disposed with the first vibration system; a through slot formed through the side wall of the magnetic bowl; a first magnet assembly disposed in the containment space, including a first magnet; a second magnet assembly stacked under the first magnet assembly, including a second magnet; a first magnetic gap formed between the first magnet assembly and the top wall of the magnetic bowl; and a second magnetic gap formed between the first magnet assembly, the second magnet assembly and the side wall of the magnetic bowl.

The first vibration system includes: a first diaphragm fixed relative to the top wall of the magnetic bowl; and a first voice coil assembly for driving the first diaphragm to vibrate.

The second vibration system includes: a second diaphragm fixed to the frame and a second voice coil assembly for driving the second diaphragm to vibrate. The first magnet and the second magnet are magnetized along a vibration direction of the coaxial speaker, and the first magnet and the second magnet are disposed opposite to each other with the same polarity.

In addition, the second vibration system further includes an elastic component supporting the second voice coil assembly; the elastic component includes a fixed part disposed in the second magnetic gap and fixed to the second voice coil assembly and a plurality of elastic arms extending from the fixed part to the outside of the magnetic bowl; the elastic arm is fixed to the frame through the through slot.

In addition, the first voice coil assembly includes a first bracket connected to the first diaphragm and a first voice coil fixed to the first bracket.

In addition, the first magnet assembly includes a first pole plate stacked on a side of the first magnet close to the first diaphragm.

In addition, the coaxial speaker further includes a second bracket fixedly connected between the top wall of magnetic bowl and the second magnet assembly; wherein the second bracket ring is arranged on the first magnet outer side, and the second bracket is made of non-magnetic material.

In addition, the second magnet assembly further includes a second pole plate stacked on the side of the second magnet close to the first magnet and a second pole plate stacked on the side of the second magnet away from the first magnet; the third pole plate is fixedly connected to one end of the sidewall of the magnetic bowl away from the top wall.

In addition, the second diaphragm includes a dome part connected to the second voice coil assembly and a first suspension with one end thereof connected to the dome part and another end connected to the frame.

In addition, the second diaphragm further includes a second suspension with one end fixedly connected with the magnetic bowl or the second magnet assembly, and another end connected and fixed with the dome part.

In addition, the dome part includes a main body part fixedly connected to the first suspension, a support part fixedly connected to the second voice coil assembly, and a connection part connecting the main body part and the support part; the connection part passes through the through slot of the magnetic bowl.

In addition, the frame includes a frame wall, an annular wall spaced from the frame wall, and a connection beam connecting the frame wall and the annular wall; the annular wall is fixed with the magnetic bowl.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
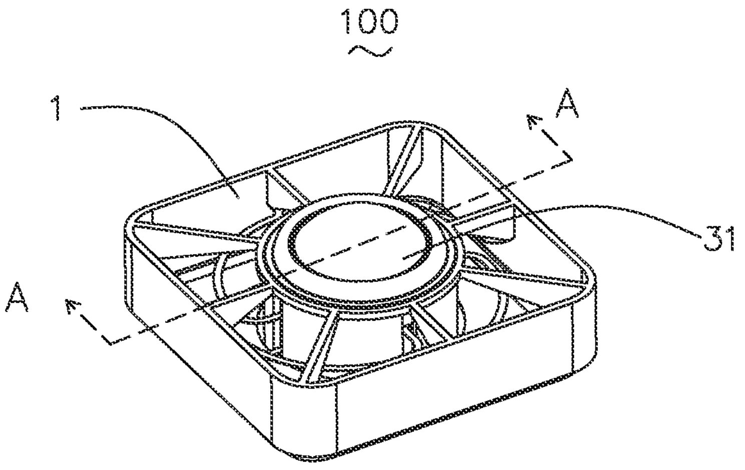
FIG. 1 is an isometric view of a coaxial speaker in accordance with an embodiment of the present invention.
Figure 2:
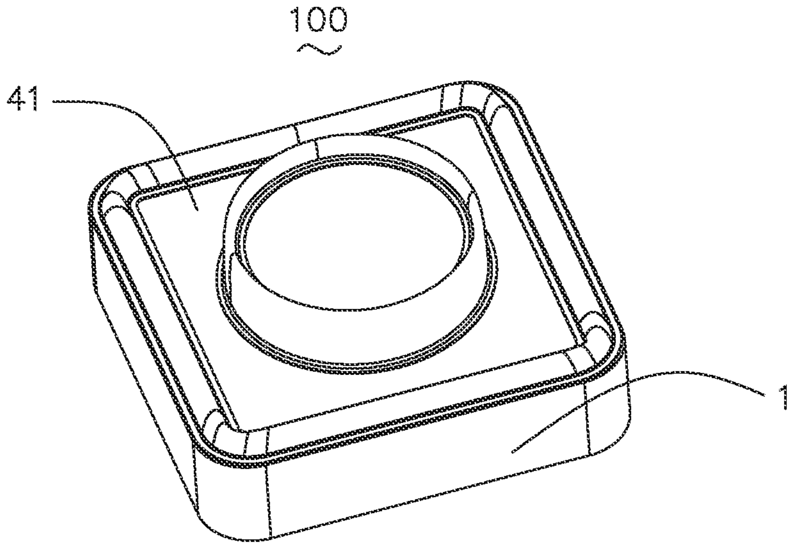
FIG. 2 is an isometric view of the coaxial speaker in FIG. 1, from another aspect.
Figure 3:
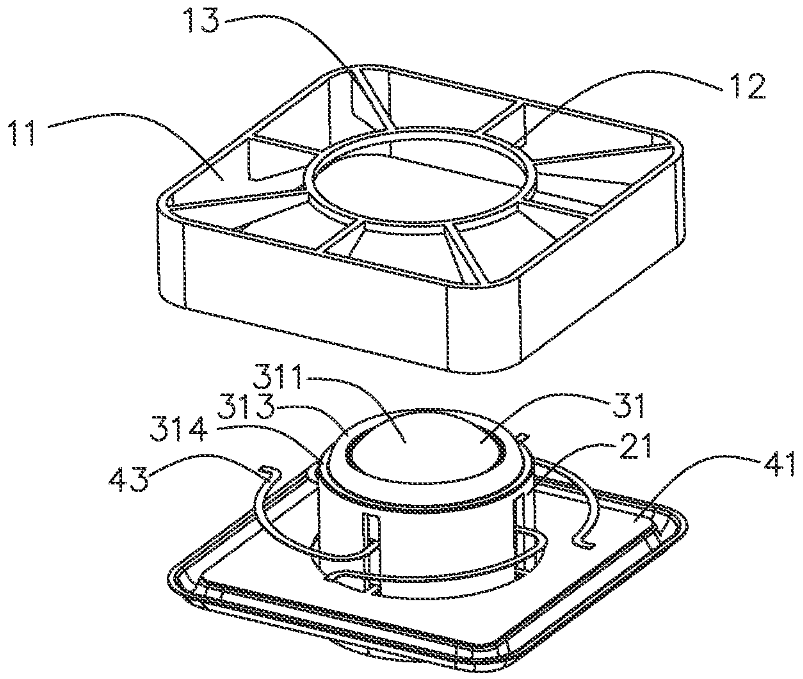
FIG. 3 is a partially exploded view of the coaxial speaker in FIG. 1.
Figure 4:
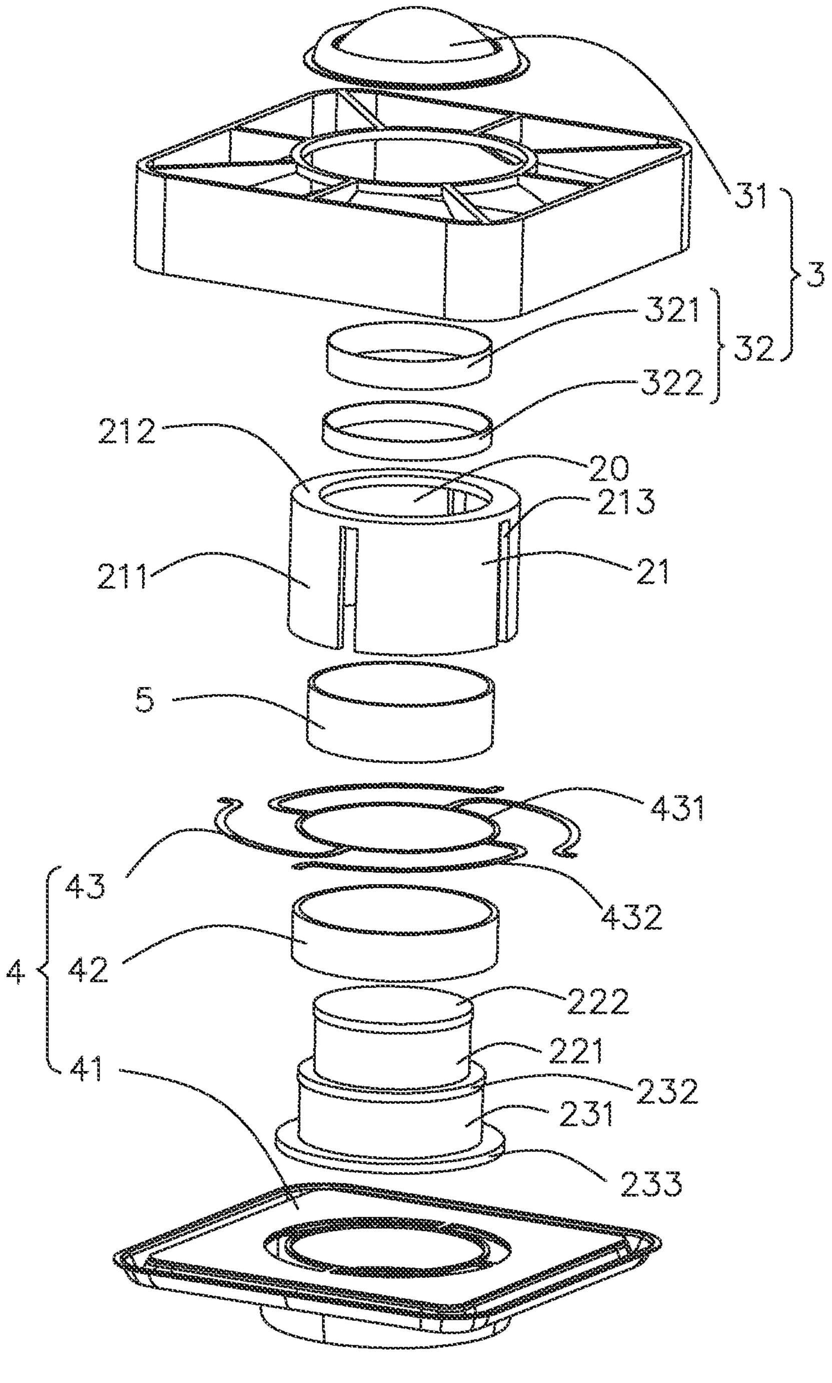
FIG. 4 is an exploded view of the coaxial speaker in FIG. 1.
Figure 5:
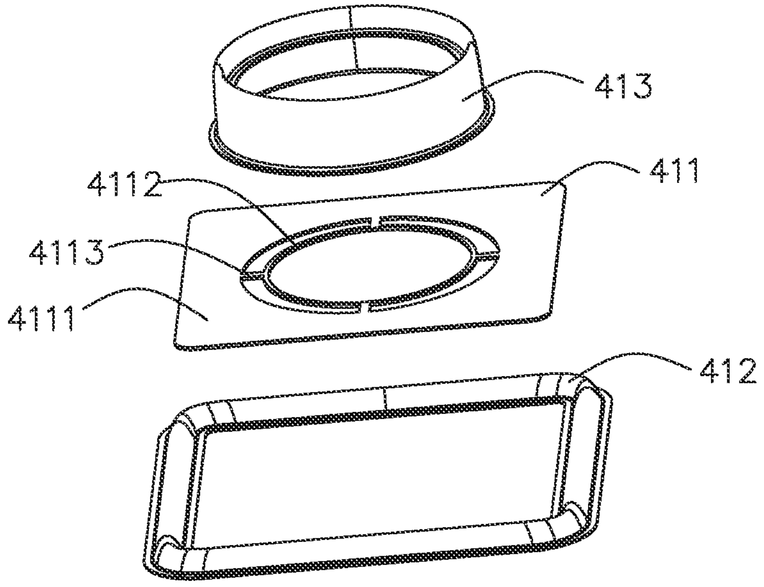
FIG. 5 is an exploded view of a second diaphragm of the coaxial speaker as shown in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Please also refer to FIGS. 1-6. the present invention provides a coaxial speaker 100, which includes a frame 1, a magnetic circuit system 2 fixed on the frame 1, and a first vibration system 3 and a second vibration system 4 fixed on the frame 1 and arranged coaxially.

The outer periphery of the frame 1 is substantially a rectangle with rounded corners, and the frame 1 includes a frame wall 11, an annular wall 12 disposed at intervals from the frame wall 11, and a connection beam 13 connecting the frame wall 11 and the annular wall 12. There is a plurality of the connection beams 13 arranged on the outer periphery of the annular wall 12 at equal intervals. The connection beam 13 gradually decreases from the frame wall 11 to the annular wall 12, so as to provide enough vibration space for the vibration system.

The magnetic circuit system 2 includes a magnetic bowl 21 with a containment space 20, a first magnet assembly 22 disposed in the containment space 20, and a second magnet assembly 23 stacked below the first magnet assembly 22. The annular wall 12 is fixed with the magnetic bowl 21. The magnetic bowl 21 includes a side wall 211 surrounded and forming a containment space 20, and a top wall 212 formed by bending and extending from one end of the side wall 211, the inner edge of the top wall 212 is surrounded by a through hole. The side wall 211 of the magnetic bowl 21 is provided with a through slot 213 therethrough. In this embodiment, the through slot 213 runs through the entire side wall 211 from top to bottom. In other embodiment, the length of through slot 213 can be set according to actual needs. A first magnetic gap 24 is formed between the first magnet assembly 22 and the top wall 212 of the magnetic bowl 21. A second magnetic gap 25 is formed between the first magnet assembly 22, the second magnet assembly 23 and the side wall 211 of the magnetic bowl 21.

The first magnet assembly 22 and the second magnet assembly 23 are arranged coaxially. The first magnet assembly 22 includes a first magnet 221 and a first pole plate 222 stacked on the first magnet 221 near the first real system 3. The first magnet 221 is magnetized along the vibration direction of the coaxial speaker 100. The second magnet assembly 23 includes a second magnet 231, a second pole plate 232 stacked on the side of the second magnet 231 close to the first magnet 221, and a third pole plate 233 stacked on the side of the second magnet 232 away from the first magnet 221. The third pole plate 233 is fixedly connected to one end of the magnetic bowl 21 side wall 211 away from the top wall 212. The second magnet 231 is magnetized along the vibration direction of the coaxial speaker 100, and the first magnet 221 and the second magnet 231 are disposed opposite to each other with the same polarity. In this embodiment, the first magnet 221, the first pole plate 222, the second magnet 231, the second pole plate 232, and the third pole plate 233 are all pie-shaped structures.

The first vibration system 3 includes a first diaphragm 31 fixed relative to the top wall 212 of the magnetic bowl 21 and a first voice coil assembly 32 that drives the first diaphragm 31 to vibrate and sound. first voice coil assembly 32 is inserted into the first magnetic gap 24 at least partially. A high-volume diaphragm, and its sounding direction is upward along the vibration direction. The first diaphragm 31 includes a first protrusion part 311 arranged in the middle position, a sunken part 312 arranged around the outer circumference of the first protrusion part 311, a second protrusion part 313, which is arranged around the outer periphery of the sunken part 312, and an attached part 314 arranged around the outer periphery of the second protrusion part 313. The attached part 314 can be directly fixed on the top wall 212 of the magnetic bowl 21, or can be fixed on the annular wall 12 of the frame 1. The first voice coil assembly 32 includes a first bracket 321 connected to the first diaphragm 31 and a first voice coil 322 fixed to the first bracket 321. The first bracket 321 is connected to the sunken part 312 of the first diaphragm 31, and the first voice coil 322 is fitted and fixed to the outer side wall of the first bracket 321. In this embodiment, the outer edge of the first diaphragm 31 is circular, and both the first bracket 321 and the first voice coil 322 are circular.

The second vibration system 4 includes a second diaphragm 41 fixed to the frame 1, a second voice coil assembly 42 that drives the second diaphragm 41 to vibrate and sound, and an elastic component 43 that supports the second voice coil assembly 42. The second voice coil assembly 42 is at least partially inserted into the second magnetic gap 25. The second diaphragm 41 is a full-frequency vibration diaphragm, and its sounding direction is upward along the vibration direction, which is the same as the sounding direction of the first diaphragm 31. The second diaphragm 41 includes a dome part 411 connected to the second voice coil assembly 42, a first suspension 412 connected to the dome part 411 at one end and the frame 1 at the other end, and a second suspension 413 whose one end is fixedly connected to the magnetic bowl 21 or the second magnet assembly 23. The other end of the second suspension 413 is connected and fixed with the dome part 411, and the inner edge of the second suspension 413 is surrounded by a through hole. In this embodiment, the second suspension 413 is fixedly connected to the third pole plate 233. The dome part 411 includes a main body part 4111 fixedly connected to the first suspension 413, a support part 4112 fixedly connected to the second voice coil assembly 42, and a connection part 4113 connecting the main body part 4111 and the support part 4112. The connection part 4113 runs through the through slot 213 of the magnetic bowl 21. In this embodiment, the second voice coil assembly 42 is the second voice coil.

The elastic component 43 includes a fixed part 431 disposed in the second magnetic gap 25 and fixed to the second voice coil assembly 42 and a plurality of elastic arms 432 extending from the fixed part 431 to the outside of the magnetic bowl 21. The fixed part 431 is annular, and the elastic arm 432 runs through the through slot 213 and is fixed to the frame 1. The specific elastic arm 432 is fixedly connected to the lower surface of the frame 1 connection beam 13. The elastic arm 432 divergently extends from the fixed part 431 to provide sufficient elastic force. In this embodiment, the number of elastic arms 432 is four, and it depends on the situation in other embodiments.

The coaxial speaker 100 further includes a second bracket 5 fixedly connected between the top wall 212 of the magnetic bowl 21 and the second magnet assembly 23. The second bracket 5 is a cylindrical structure. One end of the second bracket 5 is in contact with the top wall 212 of the magnetic bowl 21. The other end is in contact with the second pole plate 232, and the second bracket 5 is arranged on the outer side of the first magnet 221. The second bracket 5 is made of non-magnetic material, so the second bracket 5 will not affect the structure of the closed magnetic circuit.

Figure 6:
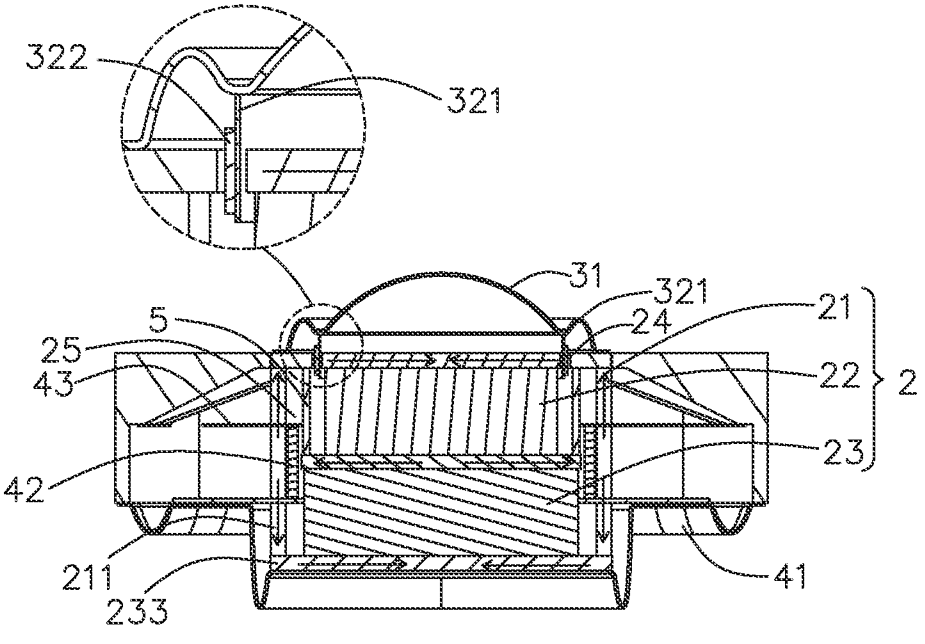
FIG. 6 is a cross-sectional view of the coaxial speaker taken along line AA in FIG. 1.

As shown in FIG. 6, the side where the first magnet and the second magnet are close to each other is taken as the N pole. The structural design of the magnetic bowl can form a closed-loop magnetic field line, as shown by the arrow direction in figure. The magnetic lines of force radiate to both sides through the position of the second pole plate, extend upward and downward through the sidewall of the magnetic bowl, and then extend from the positions of the first pole plate and the third pole plate to the middle of the coaxial speaker. This enhances the magnetic force and achieves efficient magnetic circuit utilization; the two voice coil components share the magnetic circuit to further reduce the cost.

Compared with the related art, the coaxial speaker of the present invention includes a frame, a magnetic circuit system fixed on the frame, and a first vibration system and a second vibration system fixed on the frame and arranged coaxially. The magnetic circuit system includes a magnetic bowl. The magnetic bowl includes a side wall surrounding a containment space and a top wall formed by bending and extending from one end of the side wall.

The side wall of the magnetic bowl is provided with a through slot therethrough. The magnetic circuit system further includes a first magnet assembly disposed in the containment space and a second magnet assembly stacked under the first magnet assembly. A first magnetic gap is formed between the first magnet assembly and the top wall of the magnetic bowl. A second magnetic gap is formed between the first magnet assembly, the second magnet assembly and the side wall of the magnetic bowl.

The first vibration system includes a first diaphragm fixed relative to the top wall of the magnetic bowl and a first voice coil assembly that drives the first diaphragm to vibrate and sound. the first magnetic gap at least partially. The second vibration system includes a second diaphragm fixed to the frame and a second voice coil assembly that drives the second diaphragm to vibrate and produce sound. The second voice coil assembly is at least partially inserted into the second magnetic gap. The first magnet assembly includes a first magnet, and the second magnet assembly includes a second magnet. The first magnet and the second magnet are magnetized along the vibration direction of the coaxial speaker, and the first magnet and the second magnet are disposed opposite to each other with the same polarity.

The coaxial speaker of the present invention enhances the magnetic force by setting up a special magnetic circuit structure design. the structure of its magnetic bowl and magnet enables the magnetic circuit to form a self-closed loop and achieve high-efficiency magnetic circuit utilization. The dual voice coil components share the magnetic circuit to further reduce the cost, and the overall height of the present invention coaxial speaker is reduced.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, including:

a frame;

a magnetic circuit system fixed on the frame, including a magnetic bowl having a side wall forming a containment space and a top wall formed by bending and extending from one end of the side wall, a through slot formed through the side wall of the magnetic bowl;

a first vibration system;

a second vibration system coaxially disposed with the first vibration system;

the magnetic circuit system further includes:

a first magnet assembly disposed in the containment space, including a first magnet;

a second magnet assembly stacked under the first magnet assembly, including a second magnet;

a first magnetic gap formed between the first magnet assembly and the top wall of the magnetic bowl;

a second magnetic gap formed between the first magnet assembly, the second magnet assembly and the side wall of the magnetic bowl; wherein the first vibration system includes:

a first diaphragm fixed relative to the top wall of the magnetic bowl;

a first voice coil assembly for driving the first diaphragm to vibrate; and the second vibration system includes:

a second diaphragm fixed to the frame, a second voice coil assembly for driving the second diaphragm to vibrate, and an elastic component supporting the second voice coil assembly; the elastic component including a fixed part disposed in the second magnetic gap and fixed to the second voice coil assembly and a plurality of elastic arms extending from the fixed part to an outside of the magnetic bowl; the plurality of elastic arms are fixed to the frame through the through slot; and wherein the first magnet and the second magnet are magnetized along a vibration direction of the coaxial speaker, and the first magnet and the second magnet are disposed opposite to each other with the same polarity.

2. The coaxial speaker as described in claim 1, wherein the first voice coil assembly includes a first bracket connected to the first diaphragm and a first voice coil fixed to the first bracket.

3. The coaxial speaker as described in claim 1, wherein the first magnet assembly includes a first pole plate stacked on a side of the first magnet close to the first diaphragm.

4. The coaxial speaker as described in claim 1 further including a second bracket fixedly connected between the top wall of magnetic bowl and the second magnet assembly; wherein the second bracket is arranged on the first magnet outer side, and the second bracket is made of non-magnetic material.

5. The coaxial speaker as described in claim 1, wherein the second magnet assembly further includes a second pole plate stacked on a side of the second magnet close to the first magnet and a third pole plate stacked on another side of the second magnet away from the first magnet; the third pole plate is fixedly connected to one end of the side wall of the magnetic bowl away from the top wall.

6. The coaxial speaker as described in claim 1, wherein the second diaphragm includes a dome part connected to the second voice coil assembly and a first suspension with one end thereof connected to the dome part and another end connected to the frame.

7. The coaxial speaker as described in claim 6, wherein the second diaphragm further includes a second suspension with one end fixedly connected with the magnetic bowl or the second magnet assembly, and another end connected and fixed with the dome part.

8. The coaxial speaker as described in claim 6, wherein the dome part includes a main body part fixedly connected to the first suspension, a support part fixedly connected to the second voice coil assembly, and a connection part connecting the main body part and the support part; the connection part passes through the through slot of the magnetic bowl.

9. The coaxial speaker as described in claim 1, wherein the frame includes a frame wall, an annular wall spaced from the frame wall, and a connection beam connecting the frame wall and the annular wall; the annular wall is fixed with the magnetic bowl.

* * * * *